US007955406B2

(12) United States Patent
Smith

(10) Patent No.: US 7,955,406 B2
(45) Date of Patent: Jun. 7, 2011

(54) CYCLONIC SEPARATION APPARATUS

(75) Inventor: David Benjamin Smith, Glasgow (GB)

(73) Assignee: Hoover Limited, Pentrebach (GB)

( * ) Notice: Subject to any disclaimer, the term of this patent is extended or adjusted under 35 U.S.C. 154(b) by 0 days.

(21) Appl. No.: 11/960,022

(22) Filed: Dec. 19, 2007

(65) Prior Publication Data

US 2008/0155948 A1 Jul. 3, 2008

(30) Foreign Application Priority Data

Dec. 22, 2006 (GB) .................................. 0625572.3
Sep. 20, 2007 (GB) .................................. 0718366.8
Oct. 2, 2007 (GB) .................................. 0719198.4

(51) Int. Cl.
*B01D 45/12* (2006.01)

(52) U.S. Cl. ................. 55/346; 55/343; 55/345; 55/428

(58) Field of Classification Search .................... 55/395, 55/343, 345, 346, 349, 428, 429, 459.1, DIG. 3; 96/416
See application file for complete search history.

(56) References Cited

U.S. PATENT DOCUMENTS 2,171,248 A 8/1939 Van Berkel
6,344,064 B1 * 2/2002 Conrad .......................... 55/337
7,470,299 B2 * 12/2008 Han et al. ........................ 55/345
2005/0132529 A1 * 6/2005 Davidshofer ................... 15/347
2005/0177974 A1 * 8/2005 Conrad et al. .................. 15/353
2006/0059871 A1 3/2006 Han et al.
2006/0123590 A1 * 6/2006 Fester et al. ................... 15/353
2006/0168923 A1 * 8/2006 Lee et al. ....................... 55/345
2006/0230719 A1 * 10/2006 Han et al. ....................... 55/345
2006/0230722 A1 * 10/2006 Oh et al. ......................... 55/345
2006/0230726 A1 * 10/2006 Oh et al. ......................... 55/345

FOREIGN PATENT DOCUMENTS

| | | |
|---|---|---|
| DE | 1739315 | 2/1957 |
| DE | 202006017010 | 8/2007 |
| EP | 0885585 | 12/1998 |
| EP | 1674021 | 6/2006 |
| EP | 1692991 | 8/2006 |
| EP | 1707273 | 10/2006 |
| EP | 1867266 | 12/2007 |
| GB | 2406064 | 3/2005 |
| GB | 2410913 | 8/2005 |

* cited by examiner

*Primary Examiner* — Duane Smith
*Assistant Examiner* — Sonji Turner
(74) *Attorney, Agent, or Firm* — Gordon & Jacobson, PC

(57) ABSTRACT

A cyclonic separation apparatus comprising at least two series connected separation stages and a receptacle for collecting material separated by the separation stages is described. The first stage comprises a first cyclone separator, and the second stage comprises a plurality of parallel connected second cyclone separators. The first and second separation stages are connected by at least one transfer duct which extends through the receptacle and transfers fluid that has been partly cleaned by the first separation stage to the second separation stage.

7 Claims, 3 Drawing Sheets

CYCLONIC SEPARATION APPARATUS

BACKGROUND OF THE INVENTION

1. Field of the Invention

This invention relates to a cyclone separation apparatus.

2. Related Background Art

Cyclonic separation apparatus are well known apparatus for removing particles from a gas flow without the use of filters. Cyclone separators have found utility in the field of vacuum cleaners to separate dirt and dust from the airflow. It is well known that the separation efficiency of cyclonic separators is dependent upon the force which is applied to the particles in the airflow, in accordance with the following formula:

$$F=2mv^2/d,$$

where

F=the force applied to the particles;

m=the mass of the particle;

v=the flow velocity; and, d=the diameter of the cyclonic air flow

Thus, it is evident that the separation efficiency is inversely proportional to the diameter of the cyclone chamber, such that smaller diameter cyclones are more suited to separating lighter particles than larger diameter cyclones. Accordingly, it is well known for vacuum cleaners to incorporate a first upstream separation stage, comprising a relatively large diameter cyclone and a plurality of parallel connected downstream cyclones having a smaller diameter. In use, the upstream cyclone separates coarse dirt and dust from the airflow, whereas the downstream cyclones separate the finer dirt and dust.

Cyclonic separators for vacuum cleaners comprising two stages of separation have been proposed. U.S. Pat. No. 2,171,248 discloses an arrangement whereby a high efficiency downstream cyclone is nested co-axially inside a low efficiency upstream cyclone. The respective cyclones discharge their separated solid material into a removable receptacle comprising a central chamber for the material discharged from the downstream cyclonic chamber, and an annular chamber from material discharged from the upstream cyclonic chamber.

EP1674021 discloses a two stage cyclonic separator for a vacuum cleaner comprising a low efficiency upstream cyclone separator, followed by an array of parallel-connected mini cyclones disposed in an annular chamber, which surrounds the first cyclonic chamber. Partly cleaned air that exits first stage passes upwards by way of an axially orientated central outlet and is fed into the high efficiency cyclones. However, the complex alignment of the flow path between the two stages of the separation gives rise to a pressure drop.

DE 202006017010 discloses a two stage cyclonic separator for a vacuum cleaner again comprising a low efficiency cyclone separator followed by an array of parallel connected high efficiency cyclone separators situated above the first stage. Partly cleaned air leaving the first stage is ducted upwards through an annual cavity between the high efficiency cyclones and the outer wall of the separator unit and is then ducted regularly inwards to the respective high efficiency cyclones. This arrangement gives rise to less of a pressure drop. However, in situations where the high efficiency cyclones are not disposed equidistantly on the periphery of the separator unit, the cyclones can become unevenly loaded with respect to the dust laden air, and can result in the blocking of some cyclones.

SUMMARY OF THE INVENTION

In accordance with the present invention, a cyclonic separation apparatus which alleviates the above-mentioned problem comprises a first separation stage and second separation stage, the first stage comprising a first cyclone separator, the second stage comprising a plurality of parallel connected second cyclone separators, the apparatus further comprising a receptacle for collecting material separated by the second cyclone separators, the first and second separation stages arranged in fluid communication by at least one transfer duct which transfers fluid that has been partly cleaned by the first separation stage, to the second separation stage, wherein the at least one transfer duct extends through the receptacle.

Preferably, the at least one transfer duct extends substantially parallel to the rotational axis of the cyclone separators of the first and second separation stages.

Preferably, the second cyclone separators are arranged in plurality of groups.

The cyclonic separation apparatus preferably comprises a plurality of transfer ducts. Each transfer duct preferably transfers fluid to one group of the plurality of groups of second cyclone separators.

Preferably, each group of second cyclone separators are arranged equidistantly from the downstream end of the respective transfer duct to avoid uneven loading of the second cyclone separators of the group.

Preferably, the receptacle is disposed partly above the first separation stage.

Preferably, the cyclonic separation apparatus comprises a collection chamber disposed axially within the first separation stage, for collecting material discharged by the first and second cyclone separators.

Preferably, the receptacle is funnel shaped and discharges material separated by the second separation stage into the collection chamber.

Preferably, the first separation stage and second separation stage are connected in series.

BRIEF DESCRIPTION OF THE DRAWINGS

An embodiment of the present invention will now be described by way of example only and with reference to the accompanying drawings in which.

DETAILED DESCRIPTION OF THE PREFERRED EMBODIMENT

Figure 1:
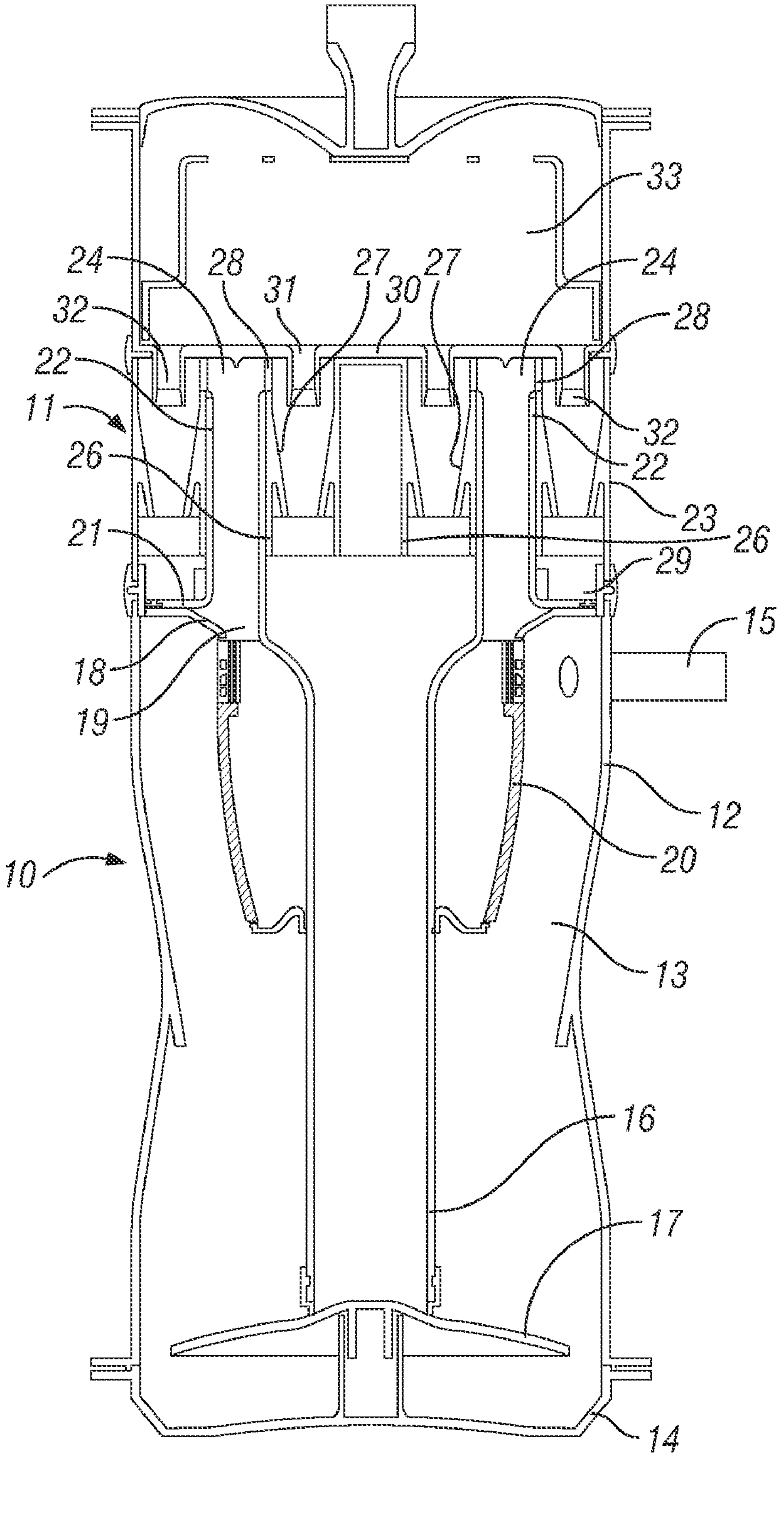
FIG. 1 is a longitudinal-sectional view through the separation portion of a 2-stage cyclonic vacuum cleaner in accordance with the present invention.

Referring to FIG. 1 of the drawings, there is shown the separation portion of an upright vacuum cleaner. The separation portion is mounted to a chassis (not shown) incorporating a handle, the lower end of the chassis being pivotally interconnected to a wheeled floor-cleaning head incorporating a rotatable agitator brush.

The separation portion comprises a generally cylindrical upright housing, which houses the first and second separation stages 10, 11 at its lower and upper ends respectively, the second stage 11 being fluidly connected downstream of the first stage 10.

The first stage 10 comprises a tubular side wall 12 defining a circular-section cyclone chamber 13. The lower end of the tubular side wall 12 is provided with a closure 14, which can be opened to allow separated dirt and dust to be emptied from the chamber 13.

An inlet duct 15 for carrying dirt and dust laden air from the floor cleaning head extends tangentially into the upper end of the tubular side wall 12 of the first stage 10. An elongate tubular container 16 extends through the cyclone chamber 13 along the centre axis thereof. The lower end of the container 16 is sealingly closed by a disk 17, which is mounted to the closure 14 such that the lower end of the container 16 is also opened when the closure 14 is opened. The upper end of the container 16 communicates with an outlet of the second stage 11 from which the separated fine dust is discharged.

The upper end of the first stage 10 is closed by an annular end wall 18 having a central aperture 19, through which the elongate container 16 extends. A perforated shroud 20 extends from the end wall 18 into the cyclone chamber 13, the lower end of the shroud being sealed against the external surface of the tubular container 16.

Figure 2:
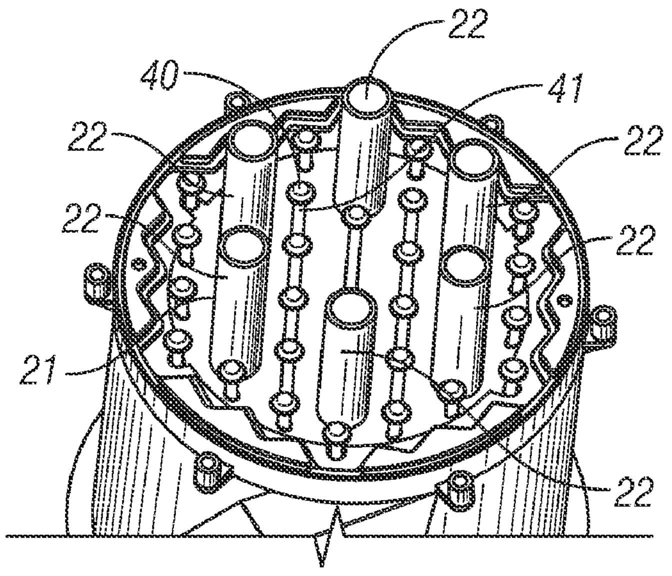
FIG. 2 is a perspective view of the top of the first stage of the cyclonic vacuum cleaner of FIG. 1, when the second stage is removed therefrom.

Referring also to FIG. 2 of the drawings, a circular manifold 21 is sealingly mounted on top of the end wall 18 of the first stage 10. The manifold 21 comprises six upstanding tubular projections 22, which are disposed at equally spaced circumferential positions on a concentric circular line on the manifold 21. The lower end of the projections 22 fluidly communicate with the space inside the shroud 20 through the aperture 19 in the end wall 18 of the first stage 10.

Figure 3:
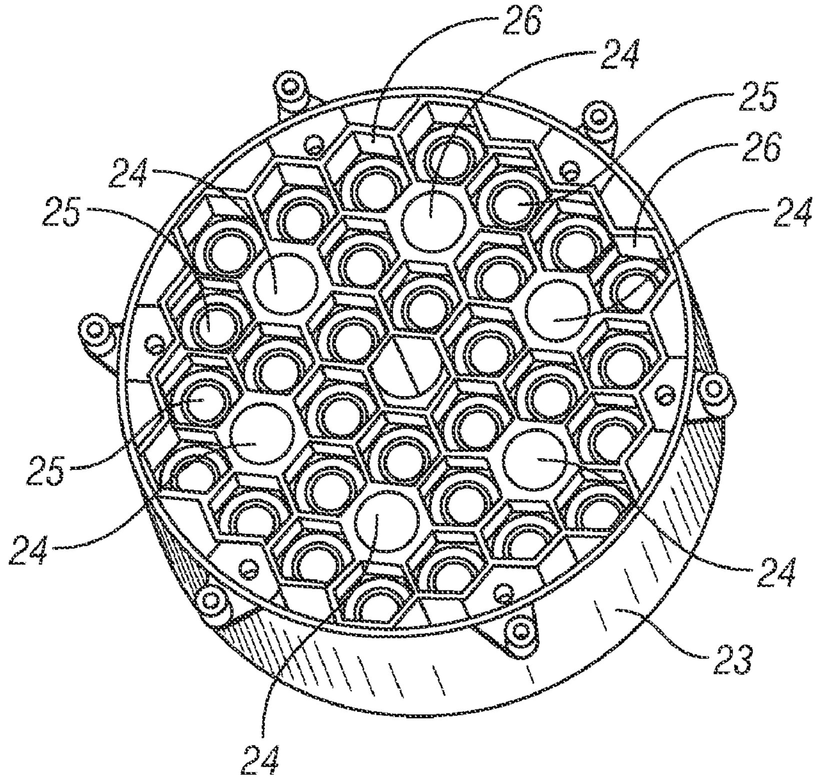
FIG. 3 is a perspective view of the bottom of the second stage of the cyclonic vacuum cleaner of FIG. 1.

Referring to FIG. 3 of the drawings, the second stage 11 comprises a cylindrical main body 23, which is fitted to the upper end of the first stage 10, the manifold projections 22 extending into corresponding apertures 24 which extend through the body 23 between opposite sides thereof. Each aperture 24 is surrounded by six cyclone separators 25 which extend axially therewith and which are equally spaced around the circumference of the apertures 24. The cyclone separators 25 are contained within hexagonal tubular boundary walls 26. Each cyclone separator 25 comprises a frusto-conical side wall 27 (as shown in FIG. 1 of the drawings), which tapers inwardly to a cone opening at the lower end of the body 23.

Figure 4:
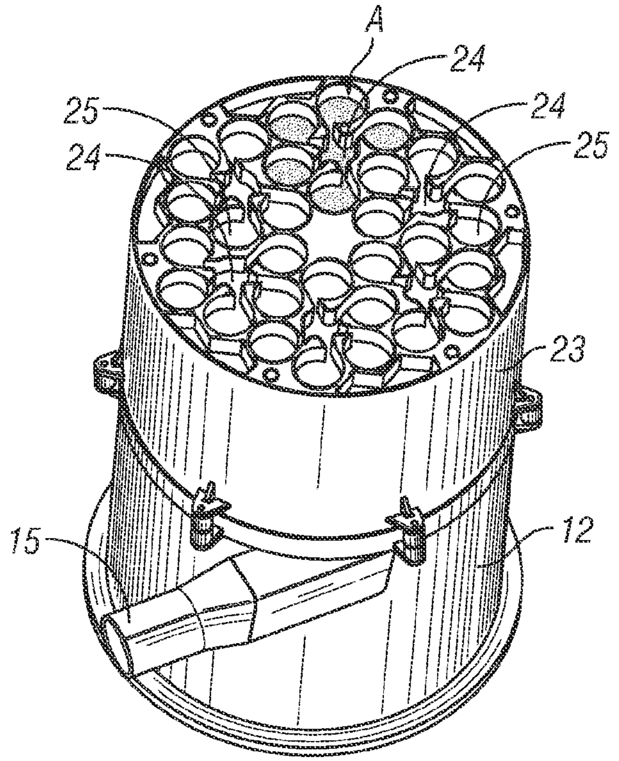
FIG. 4 is a perspective view of the top of the second stage of the cyclonic vacuum cleaner of FIG. 1, when fitted to the first stage.

Referring to FIG. 4 of the drawings, the cyclone separators 25 are arranged in six groups, each group e.g. A (as denoted by the shaded area in FIG. 4) comprises five cyclone separators 25 arranged about a respective aperture 24 and disposed in an arc, which is centred on the central axis of the respective aperture 24. It will be appreciated that one of the six cyclone separators 25 surrounding each aperture 24 belongs to an adjacent group of separators.

Five channels 28 extend radially outwardly from the upper end of each aperture 24 in the upper surface of body 23. The channels 28 lead tangentially into the upper ends of respective cyclone separators 25 of the group of separators associated with that aperture.

The lower ends of the frusto-conical walls 27 of the cyclone separators 25 terminate above the level of their respective hexagonal tubular boundary walls 26, in order to prevent any cyclonic air flow from being carried over to below the bottom surface of the body 23. As shown in FIG. 2, baffles 40 supported by stems 41 extending from the upper surface of the manifold 21 may be positioned inside each hexagonal tubular boundary wall 26, just below the opening of each cone. The bottom end of the hexagonal boundary walls 26 open into a gallery 29 formed below the body 23 and above the manifold 21. The floor of the gallery 29 comprises an opening at its centre which is connected to the upper end of the elongate tubular container 16 that extends through the cyclone chamber 13 of the first stage 10.

Figure 5:
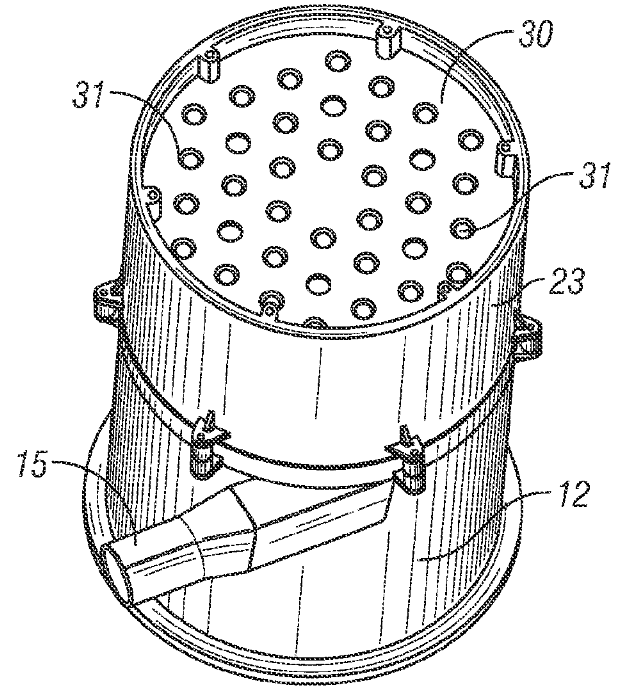
FIG. 5 is a perspective view of the top of the second stage of the cyclonic vacuum cleaner of FIG. 1, when fitted to the first stage and when a cover portion is fitted thereto.

Referring to FIG. 5 of the drawings, an apertured cover plate 30 is fitted to the upper surface of the body 23. The apertures 31 in the cover plate 30 are disposed axially above respective cyclone separators 25. The lower surface of the cover plate 30 includes tubular projections 32 which extend from the apertures 31 into the upper ends of the cyclone separators to form so-called vortex finders.

A filter housing 33 is disposed above the second stage 11 and, in use, a vacuum is applied to the filter housing 33 to cause an airflow through the first and second stages 10, 11 from the dirty air inlet 15. The tangential orientation of the inlet 15 with respect to the wall 12 creates a cyclonic air flow inside the chamber 13 of the first stage 10, whereby air spirals downwardly around the chamber 13 towards its lower end. As the air flows downwards, the volume of air in the spiral flow is constantly being diminished by virtue of it having been drawn radially through the perforated shroud 20 towards the second stage 11.

As the air swirls inside the chamber 13, larger (denser) particles in the rotating airflow have too much inertia to follow the tight curve of the airflow and strike the outside wall 12 of the chamber, moving then to the bottom of the cyclone where they are deposited in the lower region of the chamber 13.

The air flowing through the perforated shroud 20 is divided equally into six separate parallel paths along the respective tubular projections 22 of the manifold 21. The six separate air flows then divide below the lower surface of the cover plate 30 into five further air flows along the respective channels 28. The channels 28 direct the airflows tangentially into the upper end of respective cyclone separators 25 to create a cyclonic airflow therein. The airflows spiral downwardly around the frusto-conical walls 27 of the separators 25 towards their lower ends. As the air flows downwards, the volume of air in the spiral flow is constantly being diminished, by virtue it having been drawn radially inwardly and axially upwardly through the vortex finders 32.

Any light particles of dust remaining in the airflow from the first stage 10 have too much inertia to follow the very tight curve of the airflow and strike the frusto-conical walls 27 of the separators 25, the dust being carried downwardly through the cone openings and into the gallery 29. The fine dust then falls into the elongate tubular container 16. It will be appreciated that the dust separated by both the first and second stages 10, 11 can be emptied by removing the closure 14.

A vacuum cleaner in accordance with the present invention is relatively simple in construction, yet has a substantially improved separation efficiency by enabling large numbers of high-efficiency cyclones to be compactly accommodated.

While the preferred embodiment of the invention has been shown and described, it will be understood by those skilled in the art that changes of modifications may be made thereto without departing from the true spirit and scope of the invention.

I claim:

1. A cyclonic separation apparatus comprising:

a first separation stage; and a second separation stage connected to said apparatus downstream of said first separation stage, said first separation stage comprising a first cyclone separator, said second separation stage comprising a plurality of groups of cyclone separators, each group comprising a respective inlet and a plurality of second cyclone separators connected in parallel with one another to said respective inlet, said apparatus further comprising a receptacle for collecting material separated by said second cyclone separators, said first and second separation stages arranged in fluid communication by a plurality of transfer ducts which are arranged in parallel and which transfer fluid that has been partly cleaned by said first separation stage to the respective inlets of said groups of second cyclone separators of said second separation stage, wherein said plurality of transfer ducts extend through the receptacle.

2. A cyclonic separation apparatus as claimed in claim 1, wherein said cyclone separators of said first and second separation stages each have a rotational axis, and said transfer ducts extend substantially parallel to the rotational axis of each of said cyclone separators of said first and second separation stages.

3. A cyclonic separation apparatus as claimed in claim 1, wherein each transfer duct has a downstream end, and the second cyclone separators of each group are arranged equidistantly from the downstream end of the corresponding transfer duct.

4. A cyclonic separation apparatus as claimed in claim 1, wherein said receptacle is disposed partly above said first separation stage.

5. A cyclonic separation apparatus as claimed in claim 4, wherein said receptacle is disposed partially axially within the first separation stage.

6. A cyclonic separation apparatus as claimed in claim 1, wherein said receptacle is funnel shaped.

7. A cyclonic separation apparatus comprising:

a first separation stage comprising an upstream cyclone separator having a longitudinal axis and an outlet;

a body disposed axially of said upstream cyclone separator; and a second separation stage comprising a plurality of downstream cyclone separators arranged side-by-side relative to one another in said body axially of said upstream cyclone separator, the downstream cyclone separators being arranged in a plurality of groups, each of said plurality of groups having a respective inlet; and a receptacle for collecting material separated by said groups of downstream cyclone separators, said receptacle being disposed between the first and second separation stages, wherein said first and second separation stages are arranged in fluid communication by a plurality of inlet transfer ducts, each inlet transfer duct having an upstream end and a downstream end and extending fluidly in parallel through the body from said outlet of said upstream cyclone separator to the respective inlet of the corresponding group of downstream cyclone separators, and wherein said plurality of transfer ducts extend through the receptacle to transfer fluid that has been partly cleaned by said first separation stage to the respective inlets of said groups of cyclone separators of said second separation stage.

* * * * *